Jan. 12, 1937. W. C. CORYELL 2,067,312
PROCESS OF TREATING SLAG
Filed June 29, 1933 3 Sheets-Sheet 2

INVENTOR.
William C. Coryell
BY Thomas H. Ferguson
ATTORNEY.

Patented Jan. 12, 1937

2,067,312

UNITED STATES PATENT OFFICE 2,067,312

PROCESS OF TREATING SLAG

William C. Coryell, Youngstown, Ohio

Application June 29, 1933, Serial No. 678,251

12 Claims. (Cl. 49—77.5)

This invention contemplates diffusing gaseous bubbles within a molten slag mass and passing the slag thus impregnated as a stream between forming elements which shape the slag to a given cross-section and then, in some cases, breaking off slabs or blocks at the cooling end of the stream as the same advances. It also contemplates tonguing and grooving the edges of the block. In some instances this may be done by forming grooves in both edges and then placing a separate strip in one of the grooves and extending it outward far enough to provide the tongue. In other instances the tongue may be formed at the time of forming the block. Again the bar or bars inserted within the groove or grooves of the block will serve as reinforcing bars for the product block or slab. Another advance consists in strengthening the slab by a reinforcement of metal lath on one side. The surfaces of the block or slab may also be roughed during the forming steps so as to suit the same to the receiving of mortar or the like for plastered surfaces. They may be also treated so as to close over the cellular formations and thus provide a more or less continuous and unbroken surface. These and other like novel steps and products follow in the wake of the new process.

The invention in all its features is not claimed herein. Those features which relate to the bloating or impregnating of the slag mass with gas bubbles are claimed herein while those relating to the forming or molding of the advancing slag stream to produce product units are claimed in a divisional application, Ser. No. 24,319, filed May 31, 1935.

One object of the invention claimed herein is to provide a quick and continuous process for treating the slag or its equivalent while in a hot viscous state, and to this end a slag mass is passed along a continuous path and treated at different points in its travel. Preferably the travel of the mass is continuous or practically so.

Another object is to provide a novel way of introducing combustible and non-combustible materials, the former for promoting the production of gaseous bubbles which produce a foamy mass, and the latter for cooling the foaming mass and controlling the viscosity and hence the extent of the bubble formation in the slag.

Another object is to arrange for the flow of intermingled fuel material in the slag stream and particularly in the lower or unfoamed liquid portion of the same so as to fully use up the liquid in the production of the foam and at the same time produce a reasonably good distribution of the gas bubbles throughout the entire mass.

Another object is to improve the intermingling of the combustible fuel elements with the molten slag mass by constricting the slag stream at one point and introducing the fuel element into the stream at or prior to its reaching that point.

Another object is to control the character of the slag mass as it leaves the mixer and travels on to the molding and shaping position. This control is exercised by stirring the bubbly, foamy product as it passes out beyond the combustion zone. The stirring may be done mechanically, or by hand, as desired.

These various features and advantages of the invention, together with others, will be more fully understood upon reference to the following detailed description taken in connection with the accompanying drawings while the scope of the invention will be particularly pointed out in the appended claims.

The invention in its fullness is described and illustrated although, as before noted, only the method steps which have to do particularly with the production of the bubbly mass will be claimed herein.

In said drawings.

In brief, the new process comprises bringing the molten slag from a blast furnace A, or other suitable source, for it is not so important just what kind of slag or slag-like material is used, to a combustion and mixing chamber B or B'. A ladle C is commonly used to convey the molten slag from the source of supply to the mixing chamber, although slag runners may be used if the foaming chamber, B or B' be located near the furnace. The molten slag is passed through the combustion and mixing chamber B or B' in a more or less continuous stream.

As the molten slag is about to enter the chamber B or B' it is supplied with a fuel or other combustion element fed into the stream from a fuel holder D or D', or fed by hand or otherwise as may be desired. The fuel ingredient E or E' thus delivered from the holder D or D' is preferably a comminuted fuel and it is directed into the molten slag stream near the inlet of the mixing chamber, that is to say, near the beginning of the path of the slag through the chamber. A common form of comminuted fuel obtainable where molten slag is usually produced as a more or less waste product, is pulverized coking coal or coke screenings. Such fuel will be found desirable for the purposes of the present invention.

The next step in the treatment of the advancing slag stream is the introduction and diffusion of oxygen or other combustion promoting element, preferably injected through a tuyère F or F' into the mixing chamber near its bottom. The fuel and oxygen are well mixed into the mass of molten slag and as they pass along with the same the fuel is more or less completely burned by reason of the presence of the oxygen and as a result a multiplicity of gas bubbles is formed by the combustion of the particles of fuel. Indeed, a high temperature is produced and this high temperature assists materially in gasifying the fuel particles so that the resulting gas and the supplied oxygen burn vigorously and at times more or less explosively. As the fuel particles travel upward through the molten slag the intermixture of bubbles and slag substances is promoted and the settling of liquid materials is largely prevented by utilizing the same in the building up of new bubbles. Any ash left from the fuel merely adds non-combustible material to the slag mass. Any excess air that may be supplied merely adds to the bubble content of the slag. Air or oxygen or other gas furnished through the tuyère F or F' may be supplied from any suitable source, as indicated by the compressed air tank G, the oxygen being obtained from the compressed air in case of such a supply.

The fuel E or E' may be, as before indicated, a comminuted fuel and the same may be supplied in briquetted dust, small sacks, or otherwise. Such packets E or E' may be injected into the slag stream by hand or, as in the case of the packets E', carried by an elevator H associated with a supply hopper J.

As the bubbling mass passes out of the chamber B or B' it may be treated further to change its consistency and content. Thus, non-combustible material K or K' may be directed into the slag stream from a suitable holder or hopper L or L', or by hand or otherwise as desired. Such material, where non-combustible, may be pulverized slag, pulverized lime stone or the like. Where combustible, it may be any of the fuel materials herein mentioned.

In addition, the mass may be stirred at or near its point of delivery from the mixing chamber. A stirring device M may be provided for this purpose, or a certain amount of stirring may be done by hand. In some instances, stirring will be quite unnecessary, and instead of stirring, heating and other ways of treating the slag to bring about the desired changes in its constituent character may be resorted to. Obviously, the slag may be treated or not treated at this delivery point.

When the slag leaves the combustion and mixing chamber, it may be deposited in a receptacle, as the mold N on a suitable car O, or it may be deposited upon a traveling conveyor P.

When deposited on the latter it is suitably formed into an advancing slab web of definite cross-section. The ways of forming the section may vary. In the case illustrated, edge forming mechanism Q comprises edge engaging wheels which determine the width of the web and the shape of its edges, and then a transverse roller R determines the thickness of the web.

The roller R also bears a creasing bar and once per revolution this bar forms a crease in the upper face of the traveling slab. This means that the creases are formed at regular intervals. As the slab advances it cools and finally the end protrudes beyond the conveyor and ordinarily breaks off by reason of its own weight, although in some cases it may be broken off by the hand at the point indicated, or at some other point as desired. The pieces which are broken off are in the form of slabs or blocks S.

In order to facilitate the removal of the molten slag from the conveyor P, it is preferable to deposit sand or a like material upon the belt just before it encounters the slag. This material may be deposited by hand if desired, but preferably it is distributed over the belt by a sanding device U located just beneath the outlet of the mixing chamber and at the receiving end of the belt.

The blocks or slabs which are formed by breaking off the end of the continuous slab from time to time may be greatly varied in dimensions and formed to suit different classes of service. In Figs. 6 to 9 inclusive, narrow grooved blocks S' are shown. These represent slabs or blocks made in accordance with the method of the present invention. They have grooved edges and are provided variously with metal reinforcing bars and bars which form tongues for tongued and grooved building blocks. In addition, the blocks may be formed with tongues and grooves by the edging rollers. Such a block is the block S² of Fig. 12. A plain block is the block S³ of Fig. 10.

Figures 1, 2:
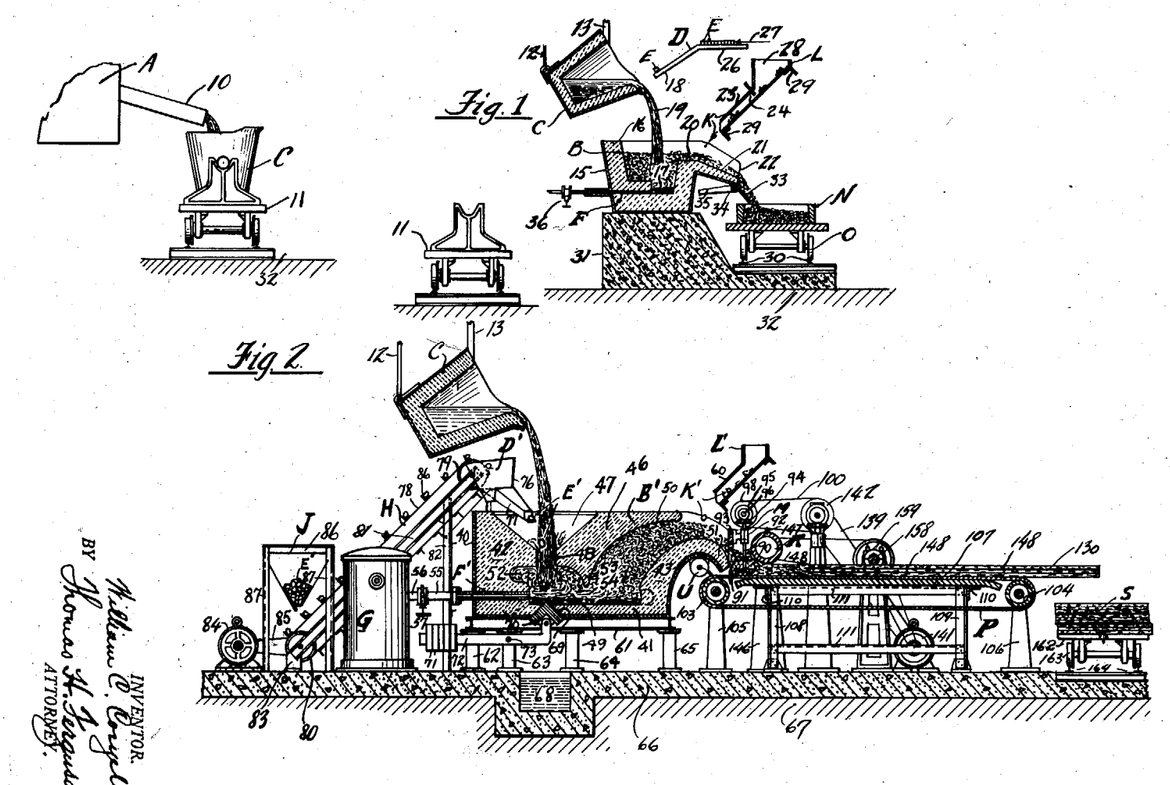
Fig. 1 is a diagrammatic view partly in section illustrating the method of the invention and suitable apparatus for carrying out the method.
Fig. 2 is a similar view of a more complete installation intended to show more fully all the steps which may be employed in practicing the invention.

In carrying out my invention, the slag which I employ may have a variety of compositions. It may be the ordinary blast furnace slag. Such slag will differ in the case of different blast furnaces. The differences in the different cases will result from the different kinds of ores and the different kinds of materials used in reducing them. The term "slag" may also be used to include mixtures and compositions which resemble slag in formation, thus various waste glass products may be mixed together in such a way as to form a bubbly mass of molten material and show a cellular structure when cooled. It is not intended to limit the present invention to the treatment of any particular kind of slag. Indeed, the term is to be used in a broad sense so as to include not only the available blast furnace slags and waste glass mixtures but all other slags and compositions which have the characteristics of slag.

Where the slag is furnished by a blast furnace A, it is drawn off through the usual "notch" or outlet 10 into ladles C. These ladles are presented one after the other at the blast furnace and filled with the slag. Ordinarily, they are carried to the filling point upon a car 11 although, in some instances, they might be presented at the filling point by a crane. Two such cars and ladles are shown in Fig. 1. Whatever way is employed for filling the ladles C with slag, the ladles are ultimately raised by a crane and brought to a position above the mixing chamber B or B' and tilted so as to pour out the contents. In the drawings, crane connections 12 and 13 are shown. These particular slag handling devices form no part of the present invention and, therefore, need not be more fully disclosed.

The combustion and mixing chamber B or B' may obviously take different forms. It is desirable to confine the molten mass received from the ladles and treat it by supplying the combustion materials at the proper points and any suitable structure which will accomplish this will be satisfactory for carrying out the steps of the invention.

In Fig. 1 a simple form of mixing chamber B is illustrated. Here, the mixer, designated B, consists essentially of an outer metal casing or container 15 and an inner lining 16 of fire clay. In some cases a solid metal mixer may be used without a fire clay lining. In the embodiment illustrated, however, the outer casing 15 is composed of relatively thin metal and there is a fire clay lining. As clearly shown, the lower part of the chamber is provided with a tuyère F. This tuyère may be of any well known construction and comprises one or more inlets for the passage of the gaseous combustion ingredient which is to be supplied to the mass of slag held in the container B. In the case illustrated, compressed air will furnish the requisite amount of oxygen for this purpose. Obviously the requisite oxygen may be provided by diffusing within the mass various oxygen compounds which will liberate oxygen within the mass in sufficient quantities to bring about the requisite combustion.

The mixer B is provided with a small space 17 which forms a sort of pocket or basin in the bottom of the container in which the liquid and heavier portions of the slag may gather. It is into the bottom of this basin or pocket that the tuyère F enters. As a result of this arrangement, all gas which is furnished through the tuyère enters into the bottom of the liquid portion of the slag and contacts with it violently so as to thoroughly stir it up and prevent a fixed settling of the liquids of the slag in that part of the container.

The little particles E of fuel which, as before stated, may be in the form of packages of comminuted coal or coke or like material, are delivered from the inclined surface 18 of the holder D directly into the slag stream 19 at the point where the latter passes out of the ladle C. Where this fuel E is composed of comminuted fuel, as stated, and especially where the same is in sacks, each package is disrupted and the fuel exposed immediately upon contact of the packet with the hot molten slag. As a result, the fuel particles pass into all portions of the stream 19 on its way down into the mixing chamber B and are thus well distributed in the mass of slag which is contained in the chamber. Consequently, when the fine streams of gas, whether it be air or otherwise, pass into the molten mass in the mixing chamber, the oxygen of the gaseous material encounters these particles of fuel in all portions of the mass within the chamber and as soon as each fuel particle is encountered by oxygen, combustion takes place with the result that a mass of gaseous bubbles is formed in the vicinity of each fuel particle. Since the fuel particles are well distributed, the result of the combustion is a well distributed multiplicity of gas bubbles throughout the entire mass of slag within the mixing chamber B. The formation of the gas bubbles produce a foam-like structure and the latter rises and passes over the upper edge of the wall 20 and down over the inclined face 21 of the spout 22 of the chamber B.

As the direction of travel of the gas through the more or less viscous mass in the chamber B. is upward, the opportunity for a uniform distribution of bubbles is greatly increased over the case where the direction of flow is horizontal. The reason for this is that as the gas and associated non-combustible material of the slag passes upward, or downward, gravity cannot act upon it to separate the liquid portion of the non-combustible material from the non-liquid portion. The result is that all the material is moving upward so as to get over the wall 20, or downward after it passes the wall, and in this way all parts of the mass are subjected to the application of the vertically moving gas and a maximum of the fuel particles is encountered with the resulting formation of the many foam producing bubbles.

As the foam passes over the wall 20 and down over the surface 21, it may be easily inspected to determine whether or not it has the proper consistency. In case it is necessary to change the consistency or to assist in the cooling of the mass a good opportunity for furnishing a modifying treatment is given. In the instance shown in Fig. 1, the holder L is provided with a chute 23 through which any suitable material may be supplied. In the present case, the material K is intended as a cooling material and for this purpose a suitable non-combustible material may be employed. If the foam passing over the bottom 21 should require a further heating, then it might be desirable to supply a combustible material through the chute 23 of the hopper L.

The holder D may, of course, be variously formed. In the present instance there are a number of fuel packets E positioned on a horizontal table 26 and these are advanced toward the inclined surface 19 and they are allowed to pass over the same into the slag stream at regular intervals or at other desired times. The direction of movement of the packages E is indicated by the arrow 27.

The hopper L also may be variously constructed. In the present instance it contains a chute 23 and an upper hopper end 28. In this instance the structure is supported by transverse angle bars 29 carried upon any suitable structure. In this case the desired fuel or non-combustible charges are preferably supplied by shoveling the same up from a supply pile and depositing them in the end 28 of the structure. The amount may be fed into the slag stream in this way as rapidly as desired; or, after the hopper 28 is sufficiently filled, the charges of material K may be fed one after the other or in a continuous stream of proper size by manipulating or setting a gate 24. By intermittent opening and closing movements the charges may be fed intermittently or by setting the gate in a slightly open position, the stream may be made of relatively small size and continuous.

The mold N carried upon the car O travels along a track having the rails 30 and the latter is positioned at an elevation such that the contents of the mixing chamber B may be readily passed into the mold. The foundation structure 31 for supporting the chamber B and the car track is formed with different elevational surfaces to provide for this difference in elevation between the two. The foundation 31 is shown as resting upon the ground 32. This continues more or less irregularly, as shown more particularly by the two track portions of Fig. 1, of the car line which carries the ladles to the blast furnace.

As soon as a mold 10 is properly filled with the foamy mass of slag which it is to hold, then the car containing it is moved on a step and a new car and mold is presented to the spout of the mixer B. In order that the foam may be properly held within the spout 22 at the time a mold is being replaced, it is necessary to provide a closing door or shutter 33 which is pivoted to the lower edge of the spout 22 and is adapted to be moved around its pivot 34 and into engagement with the end of the spout so as to hold the contents within the mixing chamber. This kind of gate or shutter is well known and need not be particularly described. In the present instance, the handle 35 is shown as one which should be moved downward and forward in order to close the shutter 33 and upward and backward to open it.

What has been set forth heretofore furnishes an illustration of the process of the present invention with the use of simple apparatus. Obviously instead of using a fuel holder D, or a material holder L, these ingredients might be thrown into the stream of slag at the points indicated by any suitable arrangement of mechanism or the same might be deposited therein by hand.

It will be seen that with the arrangement just described the ladles may be presented one after the other to the mixing chamber so as to furnish a fairly continuous supply of molten slag to the mixer. It will be apparent, too, that the latter may be made of large capacity so that if the slags coming from time to time differ in character, the ultimate product will be fairly uniform. It will also be apparent that the combustion may be regulated by regulating the supply of fuel packets E and also by varying the supply of compressed air or other gas through the agency of a control valve 36 in the tuyère connection. Then, again, besides these ways of regulating the character of the foam product, it is possible to supply either fuel or non-combustible material to the foam as it leaves the spout of the mixer.

Although the various steps of the main part of the invention may be carried out with the apparatus of Fig. 1, yet it is preferred that a more complete apparatus such as illustrated in Fig. 2 to 5 inclusive, be employed in carrying out the process described. In this case, the ladle C is the same as before and it carries the molten slag to the mixer B' in the same way as previously described.

In this case, the mixer B' comprises an outer metal casing 40 and an inner structure of fire clay. The latter includes a bottom 41 of suitable thickness, a back 42, shown as of much greater thickness than the bottom, and a front 43, and sides 44 and 45, all of a thickness about the same as that of the bottom 41. There is also preferably an overhanging partition 46 of considerable thickness and irregular in contour. The fire clay structure provides a hopper 47 having a constricted throat or passage 48 and a lower basin 49. From the forward end of the latter there is an upwardly extending passage 50 which terminates in a downwardly extending spout 51 over which the mixed product passes on its way to the conveyor P. In practice the passage 50 need not be so long and in that sense may not in reality be tubular but may be more open, somewhat more like the mixer B which is entirely open mouthed. The upwardly extending passage 50 of the chamber B' is separated from a smaller chamber 52 just beneath the throat 48 by a depending lip 53. The space between the lower edge of the lip 53 and the bottom 41 provides a throat or constricted passage 54 through which all the material must pass in its journey through the mixer.

The tuyère F' is similar in construction to the tuyère F and is connected by pipes 55, 56, to a supply tank G which is adapted to contain air under pressure obtained from any suitable source. A control valve 57 is positioned in the pipe line and controls the amount of air delivered from the supply tank G to the tuyère F'. The latter, as in the case of Fig. 1, opens into the lower pocket or basin 49 of the chamber B' and injects the air or other gas into the chamber along the bottom 41 so as to thoroughly encounter all of the material that has come into the mixer from the ladle C. The fact that the passageway 54 is a constricted passageway improves the operation of the mixer. It insures that the gas delivered by the tuyère will encounter directly or indirectly all the particles of fuel E' that have been delivered into the hopper 47.

It will be noted that the fuel in this instance is dropped into the hopper 47 and preferably at a point where it will fall toward the constricted opening 48. If the fuel packets E', as before, are made up of masses of comminuted fuel, then it will be obvious that as soon as they pass into the molten mass within the hopper the packets will be broken up and the various particles of fuel will be well distributed through the adjacent non-combustible material. The fact that the molten mass must pass through the constricted channel 48 and at that time hold the fuel which has been thrown into the hopper, insures a good mixture of the non-combustible slag and the combustible fuel as the same passes down into the smaller chamber 52 in which it begins to encounter the supply of gases from the tuyère.

Obviously as the mixture of combustible and non-combustible material passes downward and on through the constricted passage 54, it will be acted upon by the oxygen of the supply through the tuyère and combustion will result. The latter will occur wherever there is a particle of fuel, and wherever it does occur there will result a multiplicity of gaseous bubbles which will increase the foam structure of the mass. As the intermingled oxygen and fuel and non-combustible slag material rises through the passage 50, the combustion can proceed at all points and there will be, by reason of the vertically upward flow, a greater possibility of all liquid material being intermingled with the bubbles and therefore used up in making the foam structure which is desired as the product of the process.

As before suggested, the combustion raises the temperature of the hot slag and lessens the viscosity, thereby promoting the formation of the foam mixture. The length and rise of the passage or chamber 50 in which so great combustion takes place, are gauged to suit the viscosity that may be desired, the longer the chamber the greater the puffing up of the slag and the greater the certainty it will arrive at the desired mixture.

As before indicated, the hopper L' and the associated chute 60 may be used for the delivery of combustible and non-combustible material K' into the outlet spout of the hopper B'. In this way the character of the product issuing from the mixer may be to a certain extent controlled.

The hopper B' in the embodiment illustrated is carried upon channel irons 61 supported by suitable posts 62, 63, 64, 65. These, in turn, rest upon a concrete foundation 66 upon the ground 67. The foundation 61 is provided with a pit 68 below the outlet 69 of the mixer B'. The purpose of the pit is to receive in a bath of water the contents of the mixer when the latter is dumped by opening the stopper valve 70 which normally closes the opening 69. The passage of the slag into the water breaks up or granulates the slag and then it can be shoveled easily from the pit. The stopper 70 is normally held in closed position by a series of weights 71 positioned on the free end of the supporting arm 72 which is pivoted to the structure at an intermediate point 73 and has an upturned end which is secured loosely to the stopper 70. Granulated slag thus or otherwise produced can be used as one of the non-combustible materials for injection into the molten slag stream as before mentioned. In other words, slag which is granulated either by dropping into the pit or by immersion other points may be used for the purpose mentioned.

The fuel packets E', as before indicated, may be fed into the mixing chamber B' in any suitable way. If desired, this can be done by hand. It is preferred, however, to employ some mechanism for doing this at a regular rate. For this purpose in the embodiment in question a hopper 76 is located near the receiving mouth of the mixer B' but preferably a little to one side of the same so as to not interfere with the emptying of the slag from the ladles into the mixer. A trough 77 leads from the lower end of the hopper 76 and its open end is directly above the mouth 47 of the mixer. Fuel deposited in the hopper at regular intervals will pass down through the spout 77 and drop into the hopper 47 in line with the constricted throat 48 of the same.

For the purpose of feeding the fuel to the hopper 76 in proper quantities and at a proper rate, the elevator H is employed. This includes a belt 78 traveling over suitable wheels 79, 80, properly journaled in a supporting frame 81 carried upon uprights 82, 83, extending upward from the foundation 66.

The conveyor H may be driven in any suitable way as by an electric motor 84 mounted upon the foundation 66 adjacent to the lower end of the conveyor. A belt 85 transmits power from the shaft of the motor to the pulley on the shaft of the lower wheel 80. The belt 78 carries flights 86 or other suitable devices for receiving and holding the packets E' of fuel which are arranged to drop from a hopper 86 of the mechanism J at suited intervals. The hopper J is carried in any suitable way, as by means of the uprights 87. In this particular instance no special means is shown for feeding the packages E' from the hopper 86 in timed relation with the travel of the belt 78 but obviously this might be done by controlling the outlet of the hopper 86 by hand or other suitable mechanism that would insure the deposit of the requisite number of packets, one or more, upon each flight 86.

As the molten mass passes over the delivery lip 51 of the mixer B', it is also moved in a more or less vertical direction and this assists, as it did in the upward movement of the mass through the channel 50, in equalizing the distribution of the gaseous bubbles in the mass which is on its way to the conveyor P. Any combustion which may take place at this time will thus more evenly distribute the bubbles than if the direction of travel were more nearly horizontal. The result of this even distribution of the bubbles throughout the mass is a more uniform cellular structure in the product.

Figures 3, 4, 5, 6, 7, 8, 9, 10, 11, 12:
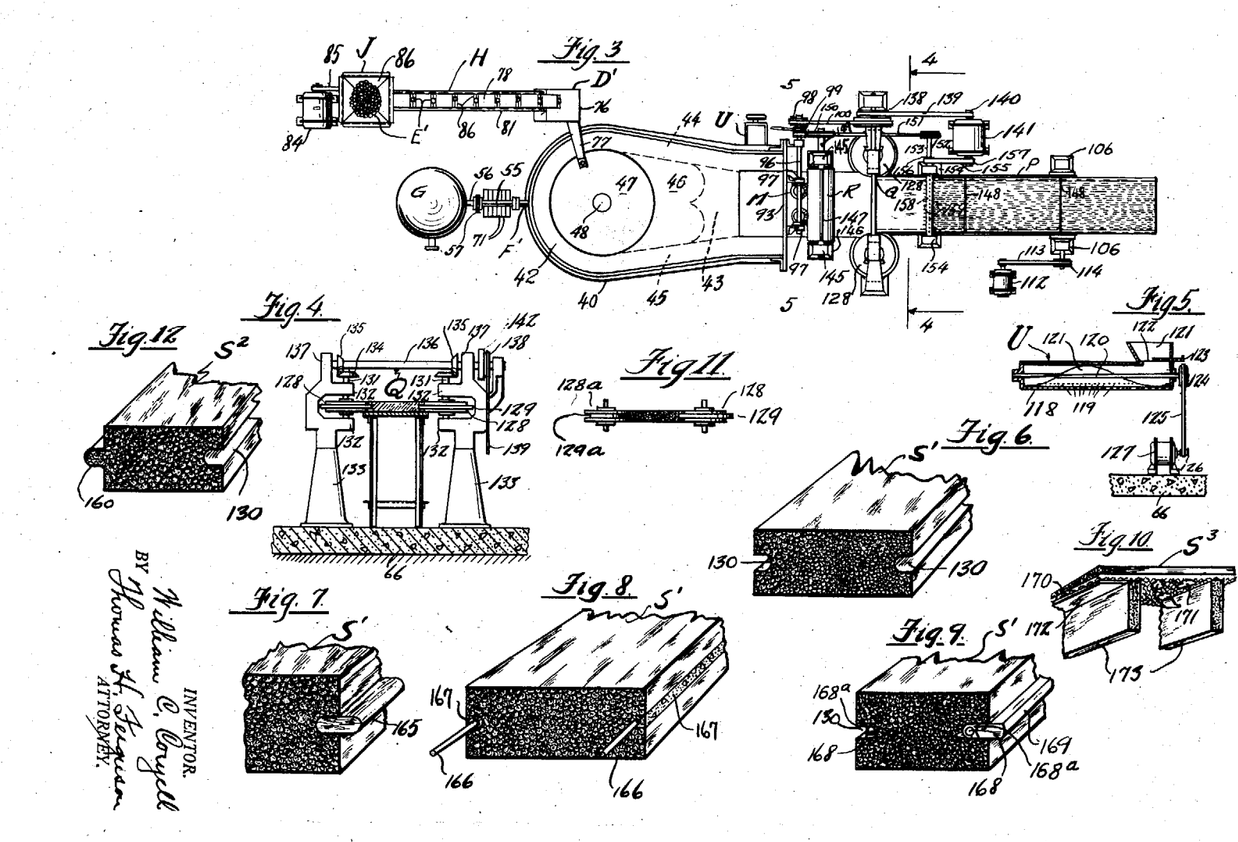
Fig. 3 is a plan view of the principal apparatus illustrated in Fig. 2.
Fig. 4 is a view mostly in elevation of the edge forming mechanism by which the grooves are placed in the edge of the slab as it travels along, the few parts in section being cut on a plane indicated by the line 4—4 of Fig. 3.
Fig. 5 is a similar view of suitable mechanism for placing sand, or the equivalent, upon the conveyor as it is about to receive the molten slag from the mixing chamber of the apparatus.
Fig. 6 is a perspective view of a portion of a block formed according to the present method and having suitable grooves in its edges.
Fig. 7 is a similar view of the same block with a tongue member inserted in one of the grooves.
Fig. 8 is a similar view of the groove block showing metal reinforcing bars or rods cemented into the two grooves.
Fig. 9 is a similar view showing the reinforcing rods in both grooves and one of the grooves also provided with a projecting tongue.
Fig. 10 is a perspective view illustrating a slab reinforced by metal lath and positioned upon supporting joists ready to receive a coat of plaster.
Fig. 11 is an elevation of the edge wheels necessary when both a tongue and groove are to be formed at the time of shaping and molding the issuing slab web.
Fig. 12 is a perspective view of a portion of a block made after the manner illustrated in Fig. 11.

To further assist in fixing the character of the ultimate product it may be desirable in some instances to agitate the mass just after it leaves the mixer B and just as it enters upon the conveyor P. Obviously a hand stirring device or tool might be used for this purpose. It is, however, preferable to employ some mechanical stirrer. Such mechanism is the stirring mechanism M. The latter includes a pair of vertical shafts 90 with stirring blades 91 at their lower ends. These shafts are suitably journaled in bearings 92 carried by a suitable frame member 93. For the purpose of rotating the shafts they are provided with bevel gear wheels 94 which cooperate with bevel gear wheels 95 carried by a horizontal shaft 96. The latter is suitably journaled in bearings 97 upon the frame member 93. The shaft 96 is extended and carries at its outer end a free running pulley 98 to which it may be secured at will by an associated clutch 99. The pulley 98 is suitably driven through a belt 100. Whenever it is desired to use a stirring device the clutch 99 is operated so as to connect the driving pulley 98 to the shaft 96. Whenever it is necessary to stop the stirring, then the clutch 99 is thrown in the opposite direction to disconnect the pulley 98 from the shaft 96.

The conveyor belt P extends substantially horizontally and travels over end rollers 103, 104, suitably journaled in bearings carried by pedestals 105, 106, which find their support in the foundation 66. The upper stretch of the belt P travels over guides 107 and rather closely engages them.

The guides 107 are supported by suitable legs 108, 109, cross members 110 and longitudinal bracing members 111. The legs in this case rest also upon the foundation 66. As shown, the receiving end of the belt P is located well beneath the spout 51 of the mixing chamber B'. The belt is in the present instance shown as driven by an electric motor 112 which operates through a belt 113 upon a driving pulley 114 upon the shaft of the roller 104. The direction of travel of the belt is such that its upper strand travels outward away from the chamber B'.

In order that the slag material may not stick to the surface of the belt P, some separating material such as sand or granulated slag or glass should be thrown upon the surface of the belt at the receiving end of its upper stretch. As before indicated, this may be done by hand, but preferably some mechanism is employed for the purpose. In the present instances, a distributor such as shown more particularly in Fig. 5 is employed.

This distributor U includes a cylindrical casing 118 having in its lower side adjacent to the belt P a series of perforations 119. Through the center of this casing 118 extends a shaft 120. This shaft carries a spiral conveyor 121 which travels so as to carry material from right to left, as the parts are shown in Fig. 5. The receiving end of the sander is provided with a hopper 121 into which the material which is to be used as the separating material upon the conveyor may be deposited. An outlet 122 is controlled in size by a slide 123. In this way the amount of granulated material which passes into the cylinder 118 may be regulated and the movement of the conveyor 121 will carry the same through the cylinder and it will pass out through the perforations 119 on to the upper surface of the upper stretch of the conveyor P. The conveyor 121 is driven through the agency of a pulley 124 on the shaft 120 driven by a belt 125 extending over the driving pulley 126 of an electric motor 127 suitably supported on the foundation 66.

The mass of slag, as it passes out upon the conveyor P, is in a foamy plastic condition and capable of being molded and shaped into a suitable slab which advances continuously. For the purpose of restricting the slab to a proper width, a pair of edging rollers is mounted to rotate in the plane of the advancing slag strip. The edge rollers may be differently formed so as to produce different edge formations upon the slab. Thus, the edge rollers 128 of Fig. 4 are provided with peripheral ribs 129. These ribs operate upon the viscous slag material to restrict it to a given width and also to provide both edges with grooves 130, as illustrated in Fig. 6, for example.

In lieu of the grooving rollers 128, it is possible to substitute for one of the rollers 128 a roller 128ª provided with a groove 129ª. In such case a slab is provided with a regular tongue and groove as illustrated in the piece between the edge wheels in Fig. 11. A similar product is the block S² of Fig. 12.

These edge rollers, whichever pair is used, are mounted, as illustrated more particularly in the case of the rollers 128, upon vertical shafts 131 journaled in suitable arms 132 upon pedestals 133 carried by the foundation 66. Bevel wheels 134, 135 upon the shafts 131 and a common driving shaft 136 cooperate in driving the edge rollers from the shaft 136. The latter, as shown, is suitably journaled in bearings in uprights 137 upon the standards 133. The shaft 136 is provided at one end with a driving pulley 138 which is driven through the agency of a belt 139 from the pulley 140 of an electric motor 141. Obviously other ways of driving the edge rollers may be employed but the way shown will suffice for the present disclosure.

At this point it may be noted that the belt 108 which drives the pulley 98 upon the driving shaft of the stirring mechanism M, is driven from a pulley 142 mounted upon the shaft 136 alongside of the pulley 138. Thus both stirring mechanism M and edging mechanism Q are operated from the same driving motor 141.

The element which controls the thickness of the slab is located nearer the outlet of the mixer B' than are the edging rolls 128. This element is in the present embodiment the roller R, previously mentioned. This roller is journaled at its ends in suitable bearings 145 mounted upon suitable standards 146 resting upon the base 66. This roller R is cyllindrical and spaced far enough away from the upper stretch of the belt P to give the required slab thickness.

At one point in its periphery the roller R is provided with a longitudinal rib 147. This rib by encountering the slag material at regular intervals produces a crease or groove 148 which extends transversely of the slag. These grooves 148 occur at regular intervals and the diameter of the roller R is chosen with a view to fixing the distance between successive grooves. Obviously, instead of producing the creases 148 by the rib 147 on the gauging roller R, the creases might be made upon the slab web by any suitable tool, operated either by hand or mechanism.

The driving shaft 149 of the roller R is provided at one end with a driving pulley 150. This pulley may be driven in any suitable way as by means of the belt 151 which passes over a driving pulley 152 located at the end of a shaft 153 suitably journaled in bearings at the upper ends of standards 154. The shaft 153 is driven in turn by a belt 155 which engages cooperating pulleys 156 and 157 on the shaft 153 and the shaft of the driving motor 141, respectively.

The shaft 153 carries a roller 158 which is provided with a number of rows of teeth 159. These teeth come close to the surface of the slab strip and comb the surface. The result of this power combing of the surface is to break down the outer walls of the cells along the top of the strip and cause the same to more or less close over the various cellular openings and thus provide a kind of roughness at the outer surface of the slab, well suited to receive and hold a coat of plaster or the like. Obviously, this combing may be done in longitudinal strips by providing the teeth 159 in groups along the roller 158. Again, the combing may be done by any suitable tool operated by hand or by other mechanism than shown.

It will be seen that as the slab web is advanced by the conveyor P it will gradually cool and the formed slab will retain its shape in cross-section. The length of the belt may be made such that the slab will be sufficiently cool by the time the delivery end of the conveyor is reached, that the protruding end of the web will break off along the line of the nearest crease 148 and thus produce a series of slabs S, which are indicated particularly in Fig. 2 as carried upon a car 162 having wheels 163 traveling on suitable track rails 164, in this instance resting upon the foundation 66.

As previously indicated, the resulting product is a series of slabs of cellular formation having plain or variously shaped edges. Thus, there may be grooves 130 in each of the edges; or, if desired, a groove 130 may be placed in one edge and a tongue 160 upon the other edge. Still other edge formations may be provided.

In furtherance of the invention, the double grooved slab or block S' may be used to build up a tongue and groove structure by placing in one of the grooves a projecting strip 165 which will project far enough beyond the edge to form a tongue adapted to fit into the groove 130 of a like tongued and grooved block. This is the structure particularly illustrated in Fig. 7.

Instead of putting strips of this kind into the groove, it may be desirable for some building purposes to reinforce the block. In such case, metal bars or rods 166 are placed in the respective grooves 130, and when pressed against the bottoms of the same, a filling of cement 167, or other like material, is employed to enclose and firmly hold the reinforcing rods. This is a structure more particularly shown in Fig. 8.

Furthermore, it may be desirable in some instances to reinforce the block and at the same time provide a tongue and groove structure. In such instance, metal reinforcing bars 168 may be deposited in the bottoms of the grooves 130 and held therein by some suitable cementitious material without closing up the groove. Then a flat strip 169 may be placed in one of the grooves and forced down against the contained reinforcing rod 168. The latter may be held in place by a like cementitious material 168ª also. With this structure, the reinforced lock of the tongue and groove variety is produced. The latter structure is the one particularly illustrated in Fig. 9.

Obviously, too, the groove 130 in a block of the preformed tongue and groove class, such as shown in Fig. 12, may be supplied with a reinforcing bar after the manner of the left hand groove 130 of Fig. 9.

A still further development of the invention is the reinforced block or slab structure of Fig. 10. As there shown a slab S³ is reinforced by a sheet of metal lath 170. To build up the reinforcement, a plain slab is first taken and laid on a flat surface. Then the sheet 170 is placed upon the upper face of the block and the sheet is secured to the slab at a number of points. The securing connection may be made in different ways. However a preferred way is to use gobs 171 of cement mortar or like plastic material capable of setting into a hard bonding material. These are placed at frequent intervals along the slab and the metal meshes of the lath are pressed into the same and so held until the bonding mortar or like material sets. Of course, if desired, the entire lath surface might be plastered over in connecting the same to the slab, as indicated by the coating 172 of plaster at the left hand end of the slab S³ as viewed in Fig. 10.

The composite slab S³, when thus made up, may be turned over and placed on floor joists 173 or other suitable supports. When placed so as to span an open space, as, for example, when resting upon floor joists as illustrated, the reinforced slab acts as a truss. The upper non-combustible material of the slab proper receives the compressional forces and the lower metal lath receives the tensional forces.

These and like composite slabs may be made up from time to time and stored away for use when needed. When in assembled position, the lath surface can of course be fully plastered over by any suitable plastering or cement mortar and finished off as desired.

Figure 13:
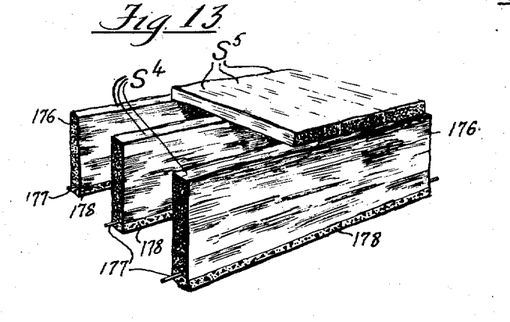
Fig. 13 is a perspective view of a floor structure employing slabs made according to the present invention in which the slab joists are reinforced.
Figure 14:
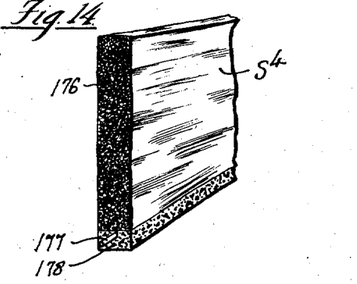
Fig. 14 is a similar view of a portion of one of the slab joists of Fig. 13, upon a slightly larger scale.

A similar reinforced building member may be provided by turning a properly dimensioned slab on edge and reinforcing its edge in somewhat the same way. Members of this kind are shown in Fig. 13 where they are shown as joists S⁴ supporting plane slabs S⁵ positioned thereon as floor boards. A somewhat larger view of one of these joists S⁴ is shown in Fig. 14. As shown in these views each joist S⁴ is built up by combining a main non-combustible member 176, a reinforcing bar 177, and a coat of mortar, concrete, or like material 178. The main member 176 of the joist S⁴ is a slab of non-combustible slag, made up in the way previously disclosed. The reinforcing member 177 is a metal bar. The latter is placed against one edge of the member 176 and held there while the coating 178 is applied. The latter is applied soft, as usual, and allowed to set. When once set, it holds the rod 177 firmly in place and the solid joist or like member S⁴ is the result. The coating 178 may obviously be variously constituted. Ordinary lime mortar, cement mortar or concrete may be used, although other cementitious materials which will harden when dried, may be used. The action is like that of the patches 171 or coating 172 of Fig. 10.

Figures 15, 16, 17, 18, 19:
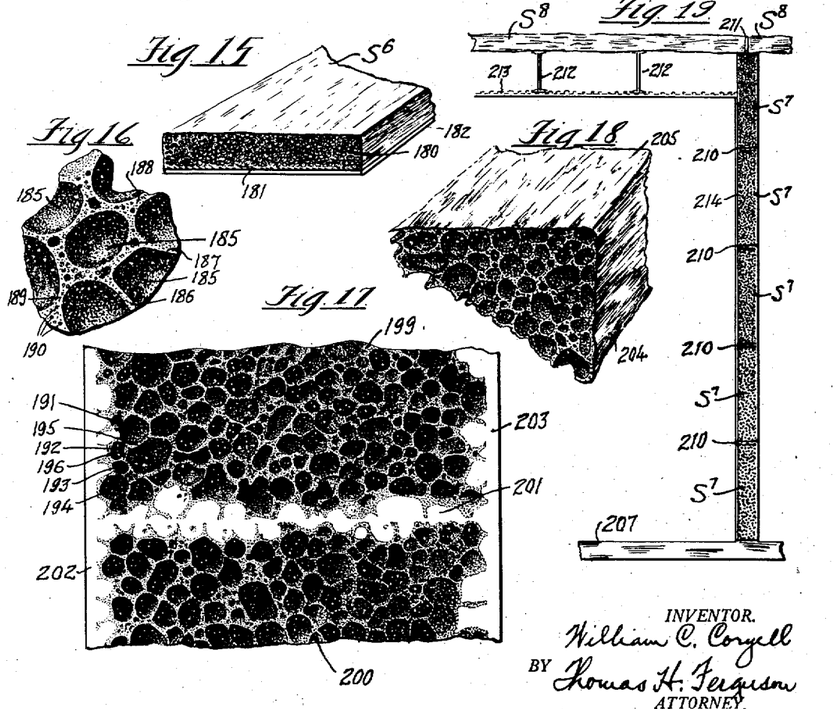
Fig. 15 is a similar view of a slab having a metal lath reinforcement throughout one of its flat faces.
Fig. 16 is a detail view illustrating the cellular structure of the new slab in detail, the same being drawn on a slightly enlarged scale.
Fig. 17 is an elevation of portions of two cellular slag blocks joined together and coated with plaster.
Fig. 18 is a perspective view of a portion of a slag block having certain of its faces relatively smooth and free from visible cellular formation and yet rough enough to easily take a coat of plaster.
Fig. 19 is an elevational view illustrating uses of the new slabs in floor and partition construction. Throughout these views like characters refer to like parts.

Again, in Fig. 15, one of the non-combustible composite slabs S⁶ is shown. This slab includes the non-combustible slab proper, designated 180, a sheet of metal lath 181 and a mortar coating 182. This member is similar to the member S⁴ but differs in having the reinforcing metal lath 181 on the side of the non-combustible element 180 instead of on its edge. The coat 182 is applied the same as the coat 178 and is composed of like materials and performs a like function. This slab is substantially like slab S³ of Fig. 10 when the latter is plastered.

The structure of the non-combustible slag product is shown in detail in Figs. 16 and 17. In the former it is magnified about three or four diameters while in the latter view it is more nearly actual size. As shown in these views, the product mass is made up of larger and smaller cells and the partitions between the several sets of cells are themselves cellular. Thus, in Fig. 16, the larger cells 185 are surrounded by walls forming partitions, such as the partitions 186, 187, 188, 189, and if we take any one of these partitions, as partition 189, we will see that the same is itself cellular, having a number of cells, as shown by the black dots 190. Again, in Fig. 17, the larger cells, such as those designated 191, 192, 193, 194, are separated by partitions, such as the partitions 195, 196, and these latter are in turn cellular in their structure, as shown by the many smaller dots.

In Fig. 17, two blocks 199, 200 are shown joined together by a layer 201 of cement, plaster or like material and these two blocks are coated on their outer surfaces by two coats 202, 203 of plaster or the like. These views show the way in which these layers 201, 202, 203 of plaster are keyed or locked into the cells of the non-combustible blocks 199, 200.

A surface like that shown in Fig. 17 can be produced by sawing a block of the foam like slag in two and then grinding or otherwise rubbing down the surface so as to polish it. This means that the ends of the partitions between the cells are in reality the surfaces which are cut and dressed in the polishing process. Where the surface is plane, these polished partition ends lie in the single plane, or other surface, of the finished block. They in fact constitute the only portion of the surface which is polished. The result of this treatment of the slag product is a beautiful and attractive surface for many building purposes. The cells receive and reflect light rays very differently. The result is a mellowing of the light and the prevention of glare. Examined in the light the cells reflect very differently, some spots appearing as light spots and others as dark spots. The effect is the mellowing effect mentioned. In like manner the cells receive and reflect sound waves and break them up and reflect them in such a way as to prevent echoing and sound reflection. This means that the product acts as a sound deadener. It is therefore an excellent surface for the interior of big halls, auditoriums, theatres and the like.

As shown in Fig. 18, and in other figures too, the exterior surfaces 204, 205 close over the main cells of the foam structure and where the end is cut off or broken off in the manner shown in Fig. 18, the cells are left exposed for finishing or coating or other treatment, as desired. Where the closed over surfaces 204, 205 are desired, it is only necessary to roll or otherwise similarly treat the surface of the slag as it passes along in the course of manufacturing the slabs. This rolling operation smooths down the cells near the surface and allows the contained bubbles to elongate and the adjacent walls to run together to provide the outside skin which makes the finished surfaces 204, 205.

In Fig. 19 is illustrated the use of slabs in building wall construction. As there shown, a series of slabs S⁷ are positioned upon one another to form a wall or partition. The lowermost slab S⁷ rests on the floor 207 and the uppermost slab S⁷ forms a support for the ends of plain floor slabs S⁸. Where these various slabs come together they are secured by mortar joints 210, 211. As here shown, beams 212 cooperate with the partition in supporting the floor slabs S⁸. A metal lath 213 is secured to the lower portions of the beams 212. Upon the lath 213 and the vertical partition formed by the slabs S⁷, a coat 214 of plaster is shown. This view is merely illustrative of a way in which the slabs of the invention can be utilized in the construction of buildings.

These various adaptations of the new slag product show the possibilities of its use in the various trades.

From what has been said it will be seen that the invention and the apparatus for putting it into practice may be varied considerably to suit different conditions and requirements of service and of the product to be produced.

Thus it will be obvious that the roller R which determines the thickness of the slab on its passage from the mixer B' may be shifted up or down to vary the thickness of the slab. The roller R might also be given a different diameter to vary the length of the slab. The same result might be had in other instances by giving a roller R of given diameter a different number of creasing bars 147. If the roller R is to be vertically adjustable then it can be made so in the same manner as the upper roll of a two high mill is made adjustable. Such constructions are well known and need not be illustrated.

Obviously too, the edging rollers 128, 128ᵃ, 129 may be varied in position in order to produce different widths of slabs. This can be done by adjusting one or both of the rollers horizontally toward and from each other like the edging rollers of a universal mill. Again, the edges of these rollers may themselves be varied to provide various shapes designed to interfit with each other.

Again, as a matter of practice the process need not stop with the foamy mass passing through the mixer B or B' once but the foam emerging from the spout 21 or 51 may be introduced into a second foaming device of like character and receive a second foaming treatment and thus be still more refined by being subjected to a compound treatment. Thus, the once treated foam may be passed from a lip 21 of mixer B to a second mixer B or B' or, again, the foam may be passed from a mixer B' to a mixer B or B' to provide the doubly treated product.

The introduction of fuel and non-combustible materials enables the fiery slag mass to be quite accurately controlled as to temperature and the character of the product. An operator should become expert in a short time in maintaining the proper control and producing the requisite finished cellular structure.

From what has been said, it will be apparent that in carrying out the steps of the present invention and producing the product herein disclosed, there may be many other alterations and modifications in the specific matters recited than those particularly mentioned, and yet the spirit and scope of the invention be not departed from. I therefore do not wish to be limited to the precise matters disclosed, but aim to cover by the terms of the appended claims all those alterations and modifications which rightly come within the purview of the invention.

I claim:

1. The process of forming a foam like cellular slag structure from slag in a viscous flowing condition, which comprises passing the slag in said viscous flowing condition as a continuously flowing stream through a tubular combustion and mixing chamber, and supplying combustion materials to the traveling slag stream near the slag inlet of said chamber, whereby gas is generated and liberated in the traveling slag stream in said chamber to produce a viscous liquid bubbly mass capable of being formed into suitable blocks or slabs.

2. The process of forming a foam like cellular slag structure from slag in a viscous flowing condition which comprises passing the slag in said viscous flowing condition as a continuously flowing stream over a path in part vertical through a tubular combustion and mixing chamber providing a directionally corresponding channel for said stream, and supplying combustion materials to said stream near the inlet of said channel, whereby gas is generated and distributed in said stream in said chamber on its way through said channel, to produce a bubbly slag product.

3. The process of producing a foam like cellular slag structure from slag in a viscous flowing condition, which comprises passing the slag in said viscous flowing condition as a continuous flowing stream into and out of a combustion and mixing chamber, distributing a fuel material in said slag stream on its way to the entrance to said chamber, and adding a combustion promoting element to the slag stream while passing through said chamber to combine with the fuel material previously distributed within said stream to produce combustion at well distributed points in the slag stream with well distributed gas bubbles in the mass and resulting well distributed cells in the product.

4. The process of producing a foam like cellular slag structure from slag in a viscous flowing condition, which comprises passing the slag in said viscous flowing condition as a continuously flowing stream in an upwardly extending path provided by a suitable combustion and mixing chamber, distributing a fuel material in said slag stream on its way to the upwardly extending portion of said path, and adding a combustion promoting element to the slag stream just prior to the beginning of its upward travel through said upwardly extending portion to combine with the fuel material distributed therein to produce combustion at well distributed points in the slag stream with well distributed gas bubbles in the mass and cells in the product.

5. The process of forming a foam like cellular slag structure from slag in a viscous flowing condition which consists in passing the slag in said viscous flowing condition downward in a continuous stream, constricting the stream at one point in its downward flow, supplying fuel materials to said stream at said constricting point, continuing the slag stream on through a tubular combustion chamber to produce combustion in the stream as it passes through said chamber with a consequent good distribution of gas bubbles in the mass, and finally guiding and shaping the foam stream as it emerges from said chamber and cools into the cellular slag product.

6. In a process of forming a foam like cellular slag structure from blast furnace slag, the steps of passing the slag as it comes from the furnace in heated condition into a funnel like passage way with a view to having a continuously flowing stream through the funnel at a definite temperature, and placing combustible material in the stream on the feeding in side of the funnel from time to time to promote combustion and thereby raise the temperature of the stream, thus, to keep the slag flowing freely through the funnel.

7. In a process of slag treatment, the steps of passing slag in a viscous flowing condition into a funnel like chamber having a discharge opening at its under side, said flowing occurring most freely when said slag is at a definite temperature, and supplying a combustion material to said stream on the ingoing side of the funnel in order to correspondingly increase the temperature of the stream at the discharge opening to thus maintain the slag stream and to regulate its speed.

8. The process of making a light foam-like cellular product, which process consists in producing a molten mass of non-combustible substance, intermixing therewith a combustible substance while the mass remains in its molten condition, subsequently intermixing oxygen with said intermixture to convert by combustion the said combustible substance into a gaseous condition, and then allowing the hot bubbly mass to cool to provide the product.

9. The process of making a light foam-like cellular product, which process consists in producing a molten mass of non-combustible substance, intermixing therewith a combustible substance and oxygen to burn the combustible substance, and then allowing the hot bubbly mass to cool to provide the product.

10. The process of making the product, which process consists in diffusing a comminuted fuel substance within a stream of molten non-combustible substance, oxidizing the fuel in the mass to cause the same to foam, and cooling the hot foamy mass into the product.

11. The process of forming a foam-like cellular slag-like structure, which comprises forming a hot viscous flowable material, passing the same into and out of a combustion and mixing chamber, supplying combustion materials to the traveling stream to produce combustion within the mass while in said chamber to cause the multiplication of gas bubbles therein, and stirring the mass as it emerges from said chamber in heated condition, to change the consistency and homogeneity of the foam product.

12. The process of making a light foamy product which consists in taking hot slag as it comes from a blast furnace and utilizing the contained heat to promote processing of the slag into the product, the processing including the addition of combustible and non-combustible ingredients to the mass at different times to promote and control the multiplication of gas bubbles in the product.

WILLIAM C. CORYELL.

CERTIFICATE OF CORRECTION.

Patent No. 2,067,312.　　　　　　　　　　　　　　　　　　　January 12, 1937.

WILLIAM C. CORYELL.

It is hereby certified that error appears in the printed specification of the above numbered patent requiring correction as follows: Page 5, first column, line 61, after the word "immersion" insert at; page 9, second column, line 21, claim 10, for "the" second occurrence, read a light foam-like cellular; and that the said Letters Patent should be read with these corrections therein that the same may conform to the record of the case in the Patent Office.

Signed and sealed this 30th day of March, A. D. 1937.

said viscous flowing condition as a continuously flowing stream in an upwardly extending path provided by a suitable combustion and mixing chamber, distributing a fuel material in said slag stream on its way to the upwardly extending portion of said path, and adding a combustion promoting element to the slag stream just prior to the beginning of its upward travel through said upwardly extending portion to combine with the fuel material distributed therein to produce combustion at well distributed points in the slag stream with well distributed gas bubbles in the mass and cells in the product.

5. The process of forming a foam like cellular slag structure from slag in a viscous flowing condition which consists in passing the slag in said viscous flowing condition downward in a continuous stream, constricting the stream at one point in its downward flow, supplying fuel materials to said stream at said constricting point, continuing the slag stream on through a tubular combustion chamber to produce combustion in the stream as it passes through said chamber with a consequent good distribution of gas bubbles in the mass, and finally guiding and shaping the foam stream as it emerges from said chamber and cools into the cellular slag product.

6. In a process of forming a foam like cellular slag structure from blast furnace slag, the steps of passing the slag as it comes from the furnace in heated condition into a funnel like passage way with a view to having a continuously flowing stream through the funnel at a definite temperature, and placing combustible material in the stream on the feeding in side of the funnel from time to time to promote combustion and thereby raise the temperature of the stream, thus, to keep the slag flowing freely through the funnel.

7. In a process of slag treatment, the steps of passing slag in a viscous flowing condition into a funnel like chamber having a discharge opening at its under side, said flowing occurring most freely when said slag is at a definite temperature, and supplying a combustion material to said stream on the ingoing side of the funnel in order to correspondingly increase the temperature of the stream at the discharge opening to thus maintain the slag stream and to regulate its speed.

8. The process of making a light foam-like cellular product, which process consists in producing a molten mass of non-combustible substance, intermixing therewith a combustible substance while the mass remains in its molten condition, subsequently intermixing oxygen with said intermixture to convert by combustion the said combustible substance into a gaseous condition, and then allowing the hot bubbly mass to cool to provide the product.

9. The process of making a light foam-like cellular product, which process consists in producing a molten mass of non-combustible substance, intermixing therewith a combustible substance and oxygen to burn the combustible substance, and then allowing the hot bubbly mass to cool to provide the product.

10. The process of making the product, which process consists in diffusing a comminuted fuel substance within a stream of molten non-combustible substance, oxidizing the fuel in the mass to cause the same to foam, and cooling the hot foamy mass into the product.

11. The process of forming a foam-like cellular slag-like structure, which comprises forming a hot viscous flowable material, passing the same into and out of a combustion and mixing chamber, supplying combustion materials to the traveling stream to produce combustion within the mass while in said chamber to cause the multiplication of gas bubbles therein, and stirring the mass as it emerges from said chamber in heated condition, to change the consistency and homogeneity of the foam product.

12. The process of making a light foamy product which consists in taking hot slag as it comes from a blast furnace and utilizing the contained heat to promote processing of the slag into the product, the processing including the addition of combustible and non-combustible ingredients to the mass at different times to promote and control the multiplication of gas bubbles in the product.

WILLIAM C. CORYELL.

CERTIFICATE OF CORRECTION.

Patent No. 2,067,312.　　　　　　　　　　　　　　　　　　January 12, 1937.

WILLIAM C. CORYELL.

It is hereby certified that error appears in the printed specification of the above numbered patent requiring correction as follows: Page 5, first column, line 61, after the word "immersion" insert at; page 9, second column, line 21, claim 10, for "the" second occurrence, read a light foam-like cellular; and that the said Letters Patent should be read with these corrections therein that the same may conform to the record of the case in the Patent Office.

Signed and sealed this 30th day of March, A. D. 1937.

CERTIFICATE OF CORRECTION.

Patent No. 2,067,312.  January 12, 1937.

WILLIAM C. CORYELL.

It is hereby certified that error appears in the printed specification of the above numbered patent requiring correction as follows: Page 5, first column, line 61, after the word "immersion" insert at; page 9, second column, line 21, claim 10, for "the" second occurrence, read a light foam-like cellular; and that the said Letters Patent should be read with these corrections therein that the same may conform to the record of the case in the Patent Office.

Signed and sealed this 30th day of March, A. D. 1937.

(Seal)

Henry Van Arsdale
Acting Commissioner of Patents.